US010306420B2

(12) United States Patent
Zhou et al.

(10) Patent No.: US 10,306,420 B2
(45) Date of Patent: May 28, 2019

(54) SELF-LOCATING COMPUTING DEVICES, SYSTEMS, AND METHODS

(71) Applicant: Intel Corporation, Santa Clara, CA (US)

(72) Inventors: Shen Zhou, Shanghai (CN); Zhijie Sheng, Shanghai (CN); Thanunathan Rangarajan, Bangalore (IN); Junjie Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/564,708

(22) PCT Filed: Jun. 3, 2015

(86) PCT No.: PCT/CN2015/080661
§ 371 (c)(1),
(2) Date: Oct. 5, 2017

(87) PCT Pub. No.: WO2016/192056
PCT Pub. Date: Dec. 8, 2016

(65) Prior Publication Data
US 2018/0077537 A1    Mar. 15, 2018

(51) Int. Cl.
*G06F 21/57*      (2013.01)
*H04W 4/04*       (2009.01)
(Continued)

(52) U.S. Cl.
CPC ........ *H04W 4/043* (2013.01); *G06F 9/45533* (2013.01); *G06F 21/44* (2013.01);
(Continued)

(58) Field of Classification Search
CPC ....... H04W 84/18; H04W 16/14; H04W 8/26; H04W 52/0229
(Continued)

(56) References Cited

U.S. PATENT DOCUMENTS 7,565,153 B2    7/2009  Alcock et al.
2007/0013516 A1*  1/2007  Freitag .................... G01S 1/68
                                            340/572.1
(Continued)

FOREIGN PATENT DOCUMENTS

EP    1942694 A1    7/2008
EP    2730106 A1    5/2014

OTHER PUBLICATIONS

International Search Report and Written Opinion dated Feb. 24, 2016 for International Application No. PCT/CN2015/080661, 11 pages.
(Continued)

*Primary Examiner* — Sam Bhattacharya
(74) *Attorney, Agent, or Firm* — Schwabe, Williamson & Wyatt, P.C.

(57) ABSTRACT

Embodiments of self-locating computing devices, systems, and methods are described. In some embodiments, a computing device may include a Wireless Credential Exchange Module (WCEM) to detect one or more location tags and a management engine, coupled to the WCEM, to retrieve information of the one or more location tags from the WCEM, and to provide an asset management server with an identifier of the computing device and the information of the one or more location tags or location information of the computing device. Other embodiments may be described and/or claimed.

25 Claims, 7 Drawing Sheets

(51) Int. Cl.
  *H04W 4/50* (2018.01)
  *H04W 4/80* (2018.01)
  *G06F 9/455* (2018.01)
  *G06F 21/44* (2013.01)
  *H04W 4/33* (2018.01)

(52) U.S. Cl.
  CPC .............. *G06F 21/57* (2013.01); *H04W 4/33* (2018.02); *H04W 4/50* (2018.02); *H04W 4/80* (2018.02)

(58) Field of Classification Search
  USPC ............. 455/41.1, 456.1, 456.3; 340/539.13, 340/572.1
  See application file for complete search history.

(56) References Cited

U.S. PATENT DOCUMENTS

| | | | |
|---|---|---|---|
| 2008/0153517 A1* | 6/2008 | Lee | H04W 4/02 455/457 |
| 2010/0289620 A1 | 11/2010 | Aminger et al. | |
| 2012/0280812 A1* | 11/2012 | Sheikman | G01S 13/825 340/539.13 |
| 2015/0058473 A1 | 2/2015 | Grande | |
| 2016/0005284 A1* | 1/2016 | Batra | G08B 25/10 340/572.1 |

OTHER PUBLICATIONS

Extended European Search Report dated Oct. 2, 2018 for European Patent Application No. 15893712.8, 7 pages.

\* cited by examiner

SELF-LOCATING COMPUTING DEVICES, SYSTEMS, AND METHODS

CROSS REFERENCE TO RELATED APPLICATIONS

The present application is a national phase entry under 35 U.S.C. § 371 of International Application No. PCT/CN2015/080661, filed Jun. 3 2015, entitled "SELF-LOCATING COMPUTING DEVICES, SYSTEMS, AND METHODS", which designated, among the various States, the United States of America. The Specifications of the PCT/CN2015/080661 Application is hereby incorporated by reference.

FIELD OF THE INVENTION

The present disclosure relates generally to the technical field of computing, and more particularly, to self-locating computing devices, systems, and methods, including application to asset management of computing devices and trusted computing.

BACKGROUND

Intelligent tracking of various computing assets, such as servers, network equipment, storage equipment, etc., in a data center is of vital importance in terms of maintenance of computing assets, controlling capital and operational expenditure, and eventually optimizing total cost of ownership (TCO). A variety of schemes have been used to track computing assets, such as servers, from basic schemes of using a spreadsheet to advanced schemes of using infrared (IR) based asset tagging or radio-frequency identification (RFID) enabled tags installed on the server chasses. These schemes have the disadvantages of being agnostic to the actual location of the computing asset or the nature of the computing asset.

Further, in a large data center or public Cloud, many end-users pose the requirement that their workloads be executed on IT assets (e.g., servers, and network and storage equipment) that belong to a trusted computing zone, which could have constraints of physical or geographical boundaries.

The background description provided herein is for generally presenting the context of the disclosure. Unless otherwise indicated herein, the materials described in this section are not prior art to the claims in this application and are not admitted to be prior art or suggestions of the prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
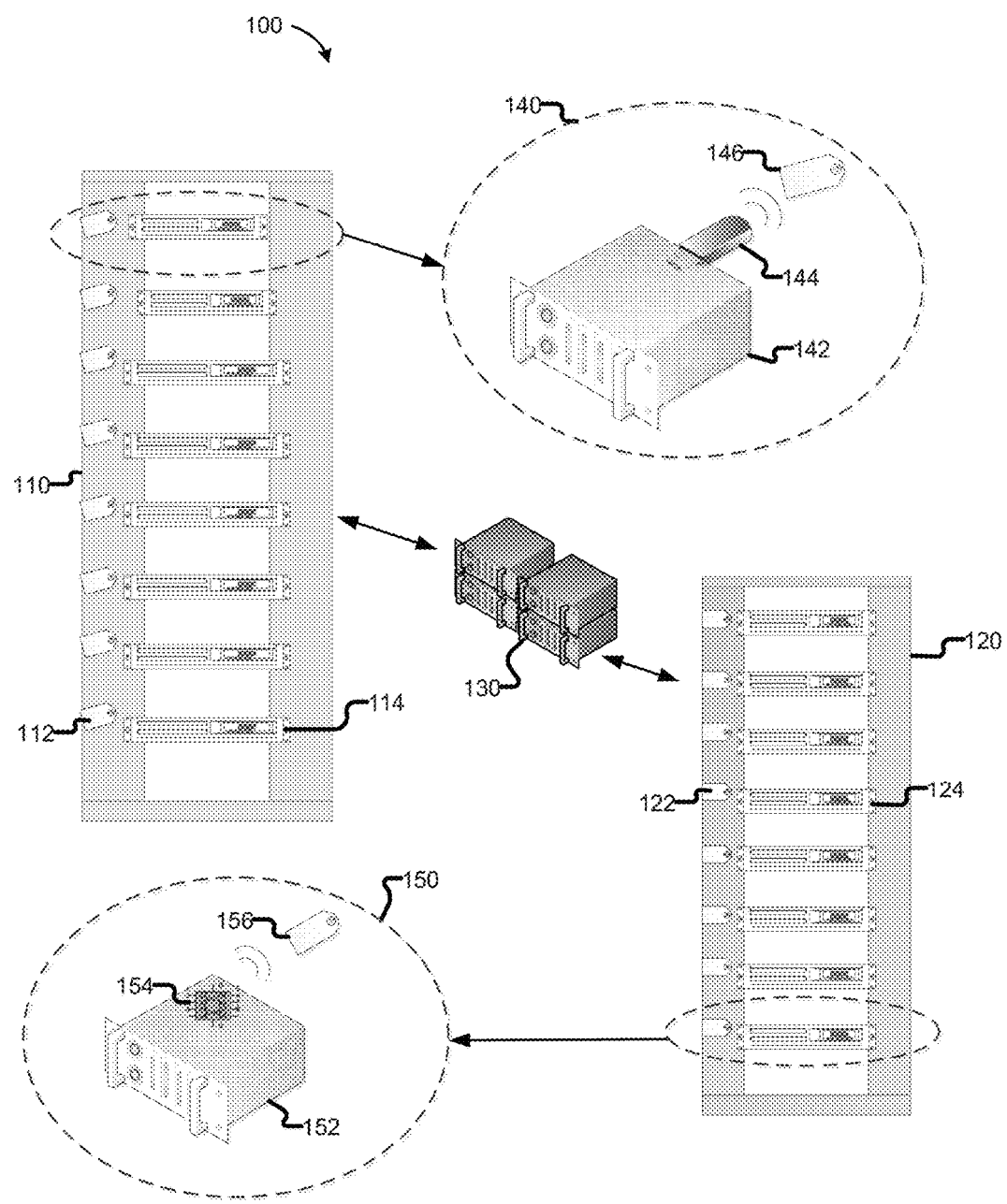
FIG. 1 is a schematic diagram illustrating an example asset management system with self-locating computing devices, incorporating aspects of the present disclosure, in accordance with various embodiments.

Embodiments of self-locating computing devices, systems, and methods, including application to asset management of computing devices and trusted computing, are described. In some embodiments, a computing asset management system may include multiple location tags with respective known locations, and an asset management server configured with information of the multiple location tags and configured to query information from a device. The computing device may include a Wireless Credential Exchange Module (WCEM) to detect one or more location tags and a management engine, coupled to the WCEM, to retrieve information of the one or more location tags from the WCEM, and to provide the asset management server with an identifier of the computing device and the information of the one or more location tags or location information of the computing device to self-locate the computing device.

In some embodiments, the self-locating computing device may interrupt a measured launch flow; detect one or more location tags external to the computing device; determine a location of the computing device based at least in part on information of the one or more location tags; authenticate the location of the computing device or the information of the one or more location tags, to self-locate the computing device, based on a trusted version of the location of the computing device or information of at least one location tag of the one or more location tags; and resume the measured launch flow upon a successful authentication. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

Referring now to FIG. 1, an example computing asset management system (AMS) 100 with self-locating computing devices, in accordance with various embodiments, is illustrated. In various embodiments, AMS 100 may include asset manager 130 communicatively coupled with various computing devices (hereinafter, simply "device") located, e.g., on rack 110 and rack 120, such as device 114, device 142, device 124, and device 152. As will be described in more detail below, asset manager 130, self-locating unit 140, self-locating unit 150, and other devices may be respectively incorporated with corresponding teachings of the present disclosure to enable asset management in AMS 100. In various embodiments, device 114, device 142, device 124, device 152, or another device may be equipped with suitable modules, such as those illustrated in connection with FIG. 2, to enable self-locating.

In embodiments, AMS 100 may include one or more wireless and/or wired networks (not shown) to operatively couple devices together. AMS 100 may be accessed via public and/or private networks, such as, but not limited to, the Internet, a telephone network (e.g., public switched telephone network (PSTN)), a local area network (LAN), a wide area network (WAN), a cable network, an Ethernet network, and so forth. Wireless communication networks may include various combinations of wireless personal area networks (WPANs), wireless local area networks (WLANs), wireless metropolitan area networks (WMANs), and/or wireless wide area networks (WWANs).

In AMS 100, some or all of these devices may have direct or indirect access via networking to each other, e.g., via a LAN or WLAN. In some embodiments, asset manager 130 and a device, e.g., device 114, may be configured to communicate with each other using Internet Protocols (IP) over a LAN or even the Internet. In some embodiments, device 142 and tag 146 may be configured, e.g., to communicate with each other using dedicated short-range communications (DSRC), near field communication (NFC), Bluetooth, or wireless use of electromagnetic fields to transfer data, such as RFID. Recognizing that the foregoing communication technologies are merely indicative of potential underlying communication technologies, which may be used between these devices, in other embodiments, different communication technologies may be used.

In various embodiments, device 114, device 142, device 124, device 152, or other devices in AMS 100 may be self-locating devices. In some embodiments, a self-locating device may detect its location and then inform asset manager 130 accordingly. In other embodiments, a self-locating device may provide location information to asset manager 130 to enable asset manager 130 to determine its location. In various embodiments, a self-locating device may detect a change of its own location and report such change to asset manager 130. In various embodiments, a self-locating device may intermittently report its own location or location information to asset manager 130 with regular or random time intervals. Accordingly, asset manager 130 may manage various assets in AMS 100 with location information of these assets.

In various embodiments, AMS 100 may be used to enable various use-cases, such as server asset management, server location tracking and audit, data center cooling and airflow optimization, etc. In various embodiments, AMS 100 may also be used to enable end-to-end security solutions that address both physical and software based attacks based on location information of these assets. As an example, asset manager 130 may ensure that a particular virtual machine (VM) or application is tethered to a desired trusted zone in a location or a desired server in a particular location. In various embodiments, AMS 100 may also be used to enable measured launch flows in a server based on the location information of the server. These and other aspects of the present disclosure will be more fully described below in connection with FIG. 2 and FIG. 4.

AMS 100 may use multiple passive or active tags, such tag 146, tag 112, tag 122, or tag 156, to identify specific locations within a system, such as a data center. In some embodiments, a unique passive tag may be assigned to each rack in a data center. In some embodiments, a unique passive tag may be assigned to each slot in rack 110 or rack 120. Each tag and its location may be recorded in a file or a database accessible to asset manager 130. In some embodiments, passive or active tags may be strategically assigned to selected locations in a rack or in a server room, so that the location of a device may be determined, e.g., based on triangulation methods. In some embodiments, tag 146, tag 112, tag 122, or tag 156 may be RFID based tags. RFID tags may be Ultra High Frequency (UHF) or High Frequency (HF) based RFID tags. RFID tags may be either passive and battery-backed or active.

In various embodiments, a device in AMS 100 may have built-in means to sense its location, such as based on its integrated or add-in RFID reader capability. In some embodiments, Wireless Credential Exchange Module (WCEM) 154 may be integrated into the server board of device 152. In some embodiments, WCEM 144 may be connected to device 142 via a USB port. In some embodiments, WCEM 154 or 144 may include an RFID reader module, which may be an EPCglobal UHF Class 1 Generation 2 (EPC Gen2) compliant RFID reader module.

In various embodiments, a device in AMS 100 may determine its location through its WCEM to function as an RFID reader. RFID tags may be used as signposts to help the device to locate itself. Thus, the device may become an intelligent self-locating and self-tracking asset in an end-to-end asset tracking and management system. As an example, in self-locating unit 140, device 142 may determine its location by commanding WCEM 144 to retrieve location information from tag 146. Similarly, in self-locating unit 150, device 152 may determine its location by commanding WCEM 154 to retrieve location information from tag 156. In some embodiments, such location information provided by a tag may include the identifier of the tag, such as its serial number. In some embodiments, such location information provided by a tag may include the predetermined location of the tag, such as a room identifier, a rack identifier, a slot identifier, GPS information, or other similar location information.

In some embodiments, a WCEM may sense its nearest location tag and associate itself with that location. Thus, a device in AMS 100 may track itself as well as its location. The devices in AMS 100 may communicate with asset manager 130, which may keep track of platform locations (e.g., slots), where devices are located (e.g., a position in the location matrix of a rack), a tag database, or an asset database. In various embodiments, asset manager 130 may also perform housekeeping related to device health through heartbeat messages. As an example, asset manager 130 may send such heartbeat messages to device 152, and cause device 152 to report its current location and platform information. AMS 100, therefore, fulfills some of the advanced security and asset tracking requirements required for a modern data center.

Figure 2:
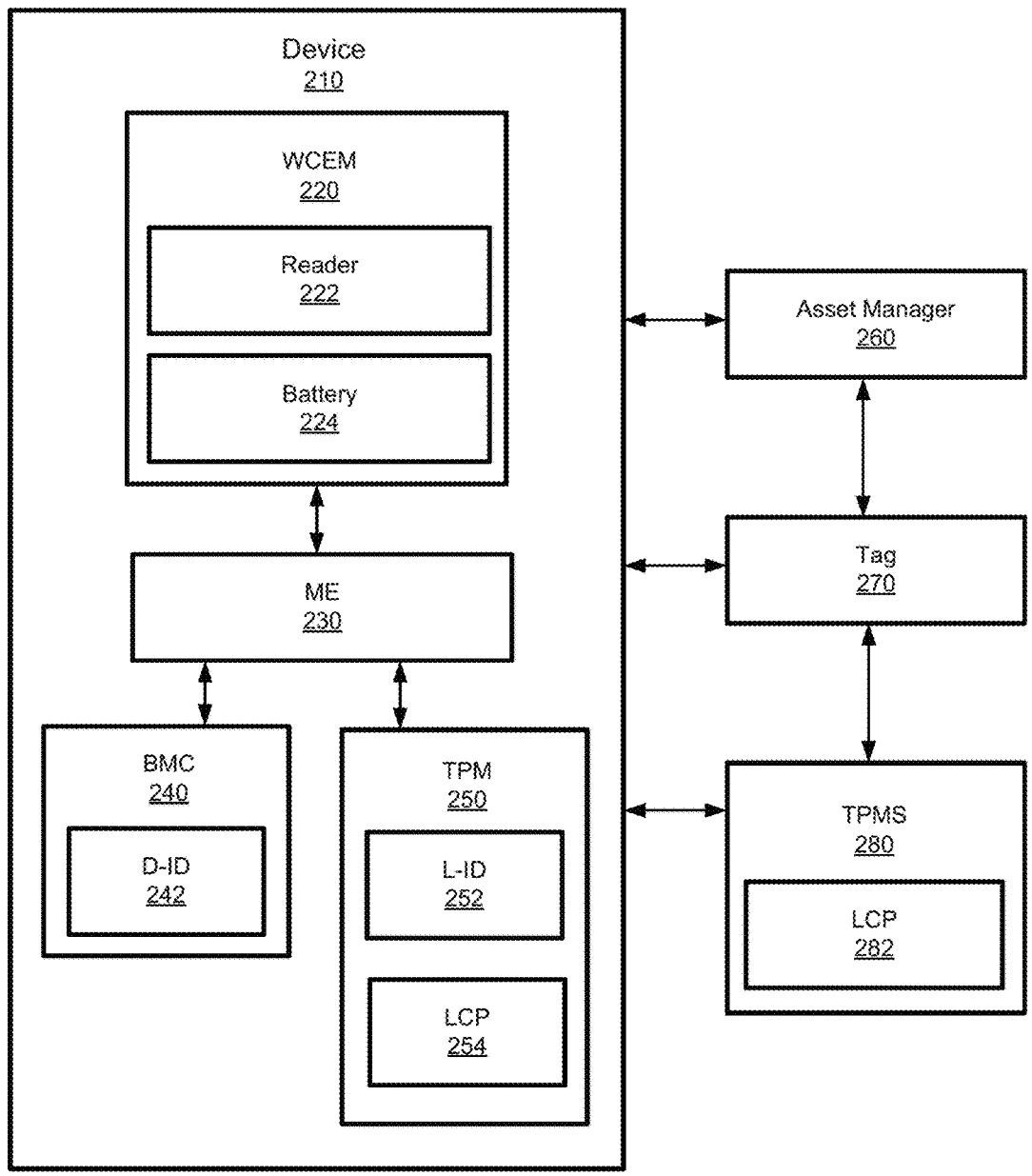
FIG. 2 is a schematic diagram illustrating an example self-locating computing device, incorporating aspects of the present disclosure, in accordance with various embodiments.

Referring now to FIG. 2, an example implementation of a self-locating device, device 210, incorporating aspects of the present disclosure, in accordance with various embodiments, is illustrated. In some embodiments, device 210 may be an internet of things (IoT) appliance in a home. In some embodiments, device 210 may be a computer in a server room or a data center. In various embodiments, device 210 may be similar to one of the devices depicted in FIG. 1, e.g., device 142 or device 152, or any device that may be managed by asset management system 100.

In various embodiments, device 210 may include WCEM 220, management engine (ME) 230, and board management controller (BMC) 240. In various embodiments, WCEM 220 may include reader 222 and battery 224. In some embodiments, BMC 240 may include device identifier (D-ID) 242, which contains a variety of identification information of device 210. In some embodiments, D-ID 242 may be located outside of BMC 240, but may still be accessible to ME 230 or BMC 240. In some embodiments, device 210 may have a default asset tag, which may be stored in non-volatile random-access memory (NVRAM) of BMC 240. ME 230 may augment the default asset tag with the information of location tag, e.g., tag 270.

In various embodiments, device 210 may utilize one or more wireless or wired networks to communicate with asset manager 260, which may function similar to asset manager 130 of FIG. 1. Those networks may include public and/or private networks, such as, but not limited to, LANs, wide area networks (WANs), or the Internet. In some embodiments, those networks may include wireless networks, like wireless personal area networks (WPANs), wireless LANs (WLANs), wireless metropolitan area networks (WMANs), or wireless wide area networks (WWANs). In some embodiments, those networks may also include cellular networks.

In various embodiments, WCEM 220 may sense a location tag (e.g., tag 270), and expose a standard Attention (AT) command interface to allow the platform firmware (e.g., ME 230) to communicate with WCEM 220. ME 230 may include firmware and software drivers that enable location awareness by periodically or on demand querying the location tag from WCEM 220. Further, ME 230 may provide location tag information retrieved from tag 270 combined with a device identifier such as a serial number (SN) selected from D-ID 242 to asset manager 260, e.g., via out-of-band Intelligent Platform Management Interface (IPMI) or a Data Center Manageability Interface (DCMI).

In some embodiments, WCEM 220 may be an onboard chip. Reader 222 may be an embedded battery-backed chip on the board that is connected to the Platform Controller Hub (PCH) to allow for control from ME 230, where the PCH may control certain data paths and support functions used in conjunction with processors, such as the system clock, Flexible Display Interface (FDI), or Direct Media Interface (DMI). In some embodiments, WCEM 220 may be an add-in card with a small energy footprint. Reader 222 may be an integrated RFID reader chip, such as the AS3992. WCEM 220 may be battery-backed through battery 224, which may be an onboard coin cell battery (e.g., complementary metal-oxide semiconductor (CMOS) battery). Battery 224 may ensure that device 210 can be located even when device 210 is powered off, thereby enhancing both tracking and security. In various embodiments, WCEM 220 may be controlled at least in part by ME 230 via a USB port, a System Management Bus (SMBus), or an Inter-Integrated Circuit ($I^2C$).

When device 210 is moved into a place, WCEM 220 may determine its location by sensing its neighborhood for location tags. In some embodiments, the nearest location tag, e.g., tag 270, may then be selected as the location ID of device 210. In this case, WCEM 220 may determine whether tag 270 is the nearest one among a plurality of location tags sensed by WCEM 220, for example, based on the relative signal strength intensity (RSSI) or time difference of arrival (TDOA).

In some embodiments, tag 270 may carry zone information. As an example, a zone may be defined as a room, a partial space of a room, or a rack. Thus, ME 230 may determine the location information of device 210 based on zone information associated with tag 270.

In some embodiments, WCEM 220 may detect respective angles of signals from at least two location tags. Thus, ME 230 may determine the location information of device 210 based at least in part on respective angles of signals from the at least two location tags, e.g., with angulation methods.

In some embodiments, WCEM 220 may detect at least four location tags. Thus, ME 230 may determine the location information of device 210 based at least in part on relative signal strength intensity (RSSI) or time difference of arrival (TDOA) of signals from the at least four location tags.

In various embodiments, WCEM 220 may determine the location information of device 210, and send a message to ME 230 to record the location in an internal repository. In some embodiments, ME 230 may then send a message to BMC 240 to update D-ID 242 to include the newly discovered tag information of tag 270 or the location of device 210.

In some embodiments, ME 230 may intercept commands from asset manager 260 for querying the location and/or platform information of device 210. As an example, such commands may include a Get Asset Tag IPMI command to query device 210 for its location. As another example, ME 230 may serve as a proxy to BMC 240 to extract system asset tag information from such commands. In some embodiments, BMC 240 may provide a selected device identifier from D-ID 242 to ME 230. Thus, ME 230 may report the location information of device 210 along with the selected device identifier to asset manager 260.

In some embodiments, ME 230 may also bundle platform data along with the location data. Platform data may include networking information, such as network utilization or bandwidth. Platform data may include processor or memory utilization. Platform data may also include device health information, such as device errors, reliability, availability, and serviceability (RAS) events, hang conditions, power down conditions, etc. Platform data may also include other asset information, such as firmware revision, Basic Input/Output System (BIOS) information, fabrication or rework identifiers, manufacturer information, operating system (OS) licensing information, etc.

In some embodiments, ME 230 may periodically query and receive the information of the location tag from WCEM 220 based on a predetermined interval to detect any change of the location of device 210, and communicate with asset manager 260 using an Intelligent Platform Management Interface (IPMI) or a Data Center Manageability Interface (DCMI). This creates the ability to perform a beacon or heartbeat for location awareness as well as asset health monitoring, thereby improving platform security and geo-tagging capabilities.

In some embodiments, asset manager 260 may periodically query the location information of device 210 using an IPMI or a DCMI. The IPMI enables an autonomous computer subsystem to provide management and monitoring capabilities independently of the central processing unit (CPU), firmware, or operating system at the host system. The DCMI specifications are closely related to IPMI, and further define a uniform set of monitoring and control features for hardware management. Thus, even if device 210 is powered off or otherwise unresponsive, ME 230 may still pass the location information to asset manager 260 in some embodiments.

In various embodiments, device 210 may further include trusted platform module (TPM) 250. TPM 250 may be used to secure hardware by integrating cryptographic keys into device 210, thus to assure the integrity of a platform. In various embodiments, TPM 250 may include location identifier (L-ID) 252 and launch control policy (LCP) 254. L-ID 252 and LCP 254 may be used to authenticate device 210, e.g., by comparing the present behavior with the known authentic behavior of device 210. In some embodiments, TPM 250 may be a standalone chip. In some embodiments, TPM 250 may be co-located on an existing motherboard chip. In some embodiments, TPM 250 may be implemented as a component in ME 230.

In some embodiments, TPM 250 may form a root of trust for device 210, e.g., for a trusted execution path (TEP) or a measured launch flow (MLF). In some embodiments, a root of trust may be generated for the MLF using a combination of the information of one or more location tags (e.g., information in L-ID) and a chipset key of the computing device (e.g., information in D-ID 242). TPM 250 may contain one or more platform configuration registers (PCRs) that allow a secure storage and reporting of security relevant metrics. L-ID 252 or LCP 254 may be stored in such PCRs in some embodiments. In some embodiments, TPM 250 may also include secure non-volatile (NV) storage (e.g. non-volatile random-access memory (NVRAM)) where the L-ID 252 or LCP 254 may be stored securely. In some embodiments, ME 230 may store the location information reported by WCEM 220 in L-ID 252, an internal register, or a PCR in TPM 250. Similarly, ME 230 may also have internal non-volatile store to hold L-ID 252 or LCP 254.

L-ID 252 or LCP 254 may be used for device 210 to detect changes to previous configurations. Accordingly, device 210 or an external device manager may determine whether to continue the MLF or TEP based on such detected changes. As an example, the boot process of device 210 may include an MLF. Device 210 may start the boot process from a trusted condition (e.g., a key defined by LCP 254) and extend this trust until the operating system has fully booted and applications are running. In some embodiments, the trusted condition may include the location information stored in L-ID 252. As an example, device 210 may allow an MLF to proceed only if the location information detected by WCEM 220 at boot time or runtime matches the location information stored in L-ID 252. In some embodiments, the trusted condition may include a hash value based on the combination of location information stored in L-ID 252 and device information stored in D-ID 242. As an example, device 210 may allow an MLF to proceed only if such hash value obtained at boot time or runtime matches such hash value stored in LCP 254.

In some embodiments, trusted pool manager server (TPMS) 280 may be used to manage a pool of servers as trusted servers for a user, one kind of virtual machine, or a type of application. As an example, TPMS 280 may manage all servers in rack 110 of FIG. 1 as a pool of trusted servers for one client while managing all servers in rack 120 of FIG. 2 as a pool of trusted servers for another client in order to mitigate the risk of intermingling clients' data. As another example, TPMS 280 may interface with a load balancer, a workload scheduler, or a Cloud OS (e.g., Openstack®, Azure® and VSphere®) to bind VMs to specific physical locations, e.g., based on L-ID 252 in the case of device 210. Thus, different VMs or applications may be tethered to different physical locations.

In some embodiments, TPMS 280 may store or have access to the information of all provisioned location tags. In some embodiments, TPMS 280 may be used to provision the location tags (e.g., tag 270). Thus, TPMS 280 may manage the location information of computing devices, e.g., device 210, based on their nearby location tags. In some embodiments, TPMS 280 may define location related metrics in LCP 282 and distribute LCP 282 to relevant servers. As an example, TPMS 280 may provide LCP 282 to device 210 for updating LCP 254. Thus, TPMS 280 may enable individual servers to create secure tethering based on their respective locations.

Figure 3:
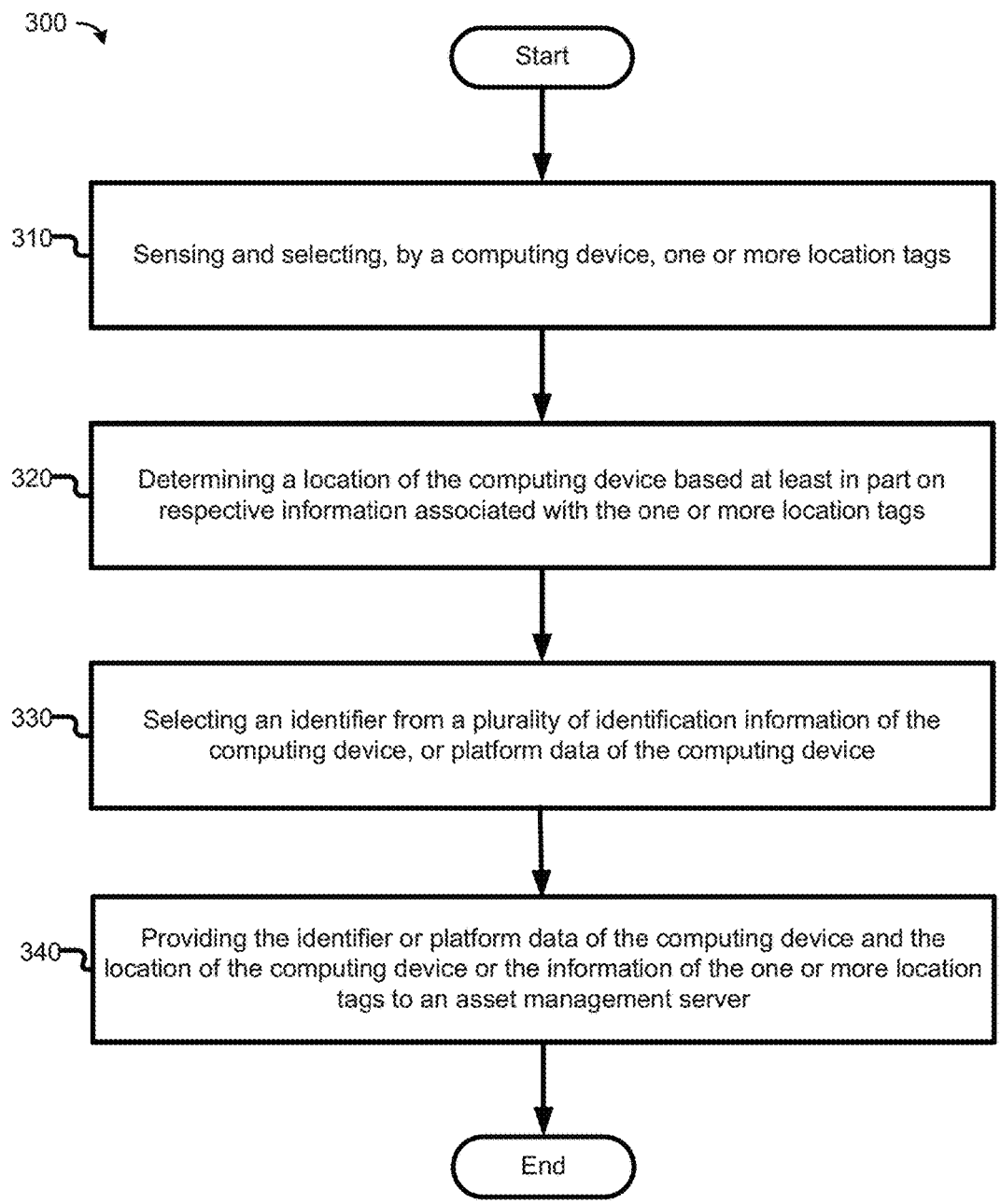
FIG. 3 is a flow diagram of an example process for self-locating a computing device, which may be practiced by an example computing device, incorporating aspects of the present disclosure, in accordance with various embodiments.

Referring now to FIG. 3, it is a flow diagram of an example process for self-locating a device, which may be practiced by an example device in accordance with various embodiments. The process 300 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for facilitating self-locating and reporting. As such, process 300 may be performed by a computing device, e.g., device 210 of FIG. 2, to implement one or more embodiments of the present disclosure. In embodiments, various blocks in FIG. 3 may be combined or arranged in any suitable order, e.g., according to the particular embodiment for asset management.

In embodiments, the process may begin at block 310, where one or more location tags may be sensed and selected by a computing device, e.g., device 210 of FIG. 2. In some embodiments, device 210 may sense EPCglobal UHF Class 1 Generation 2 (EPC Gen2) compliant RFID signals from the one or more location tags. In some embodiments, the sensing may be periodically conducted based at least in part on a predetermined time interval. In some embodiments, the one or more location tags may be selected based on relative signal strength intensity (RSSI) or time difference of arrival (TDOA) of signals from the one or more location tags.

Next, at block 320, a location of the computing device may be determined, e.g., by device 210, based at least in part on respective information associated with the one or more location tags. In some embodiments, such determination may be based at least in part on zone information associated with a location tag of the one or more location tags, where a zone may be a predefined space or location. In some embodiments, such determination may be based at least in part on respective angles of signals from the one or more location tags. In some embodiments, such determination may be based at least in part on relative RSSI or TDOA of signals from the one or more location tags.

Next, at block 330, an identifier may be selected from a plurality of identification information of the computing device, or platform data of the computing device, e.g., device 210. In various embodiments, the plurality of identifiers may include system asset identifiers, a firmware revision information, Basic Input/Output System (BIOS) revision information, rework identifiers, manufacturer information, or operating system (OS) licensing information. Platform data may include networking information, device errors, RAS events, hang conditions, or power down conditions.

Next, at block 340, the identifier or platform data of the computing device and the location of the computing device or the information of the one or more location tags may be provided, e.g., by device 210, to an asset management server, e.g., asset manager 260. In various embodiments, such information may be provided to the asset management server using an Intelligent Platform Management Interface (IPMI) or a Data Center Manageability Interface (DCMI). In some embodiments, such information may be provided to the asset management server in response to a command or an inquiry from the asset management server.

Figure 4:
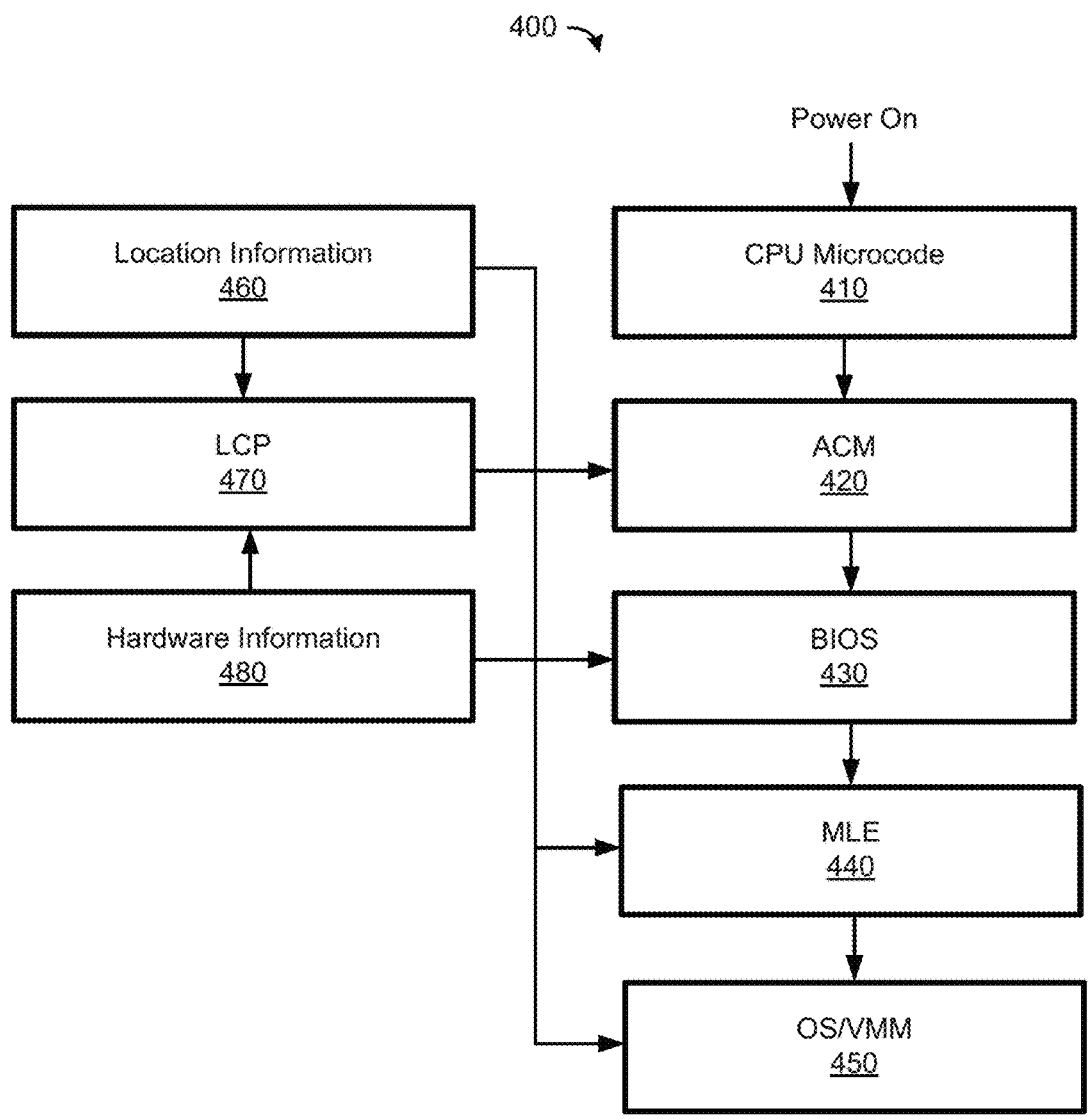
FIG. 4 is a schematic diagram of an example measured launch flow, which may be practiced by an example computing device, incorporating aspects of the present disclosure, in accordance with various embodiments.

FIG. 4 is a schematic diagram of an example measured launch flow (MLF) 400, which may be practiced by an example computing device, incorporating aspects of the present disclosure, in accordance with various embodiments. As shown in FIG. 4, MLF 400 (e.g., a system boot sequence) may include launching CPU microcode 410, authenticated code module (ACM) 420, Basic Input/Output System (BIOS) 430, measured launch environment (MLE 440, and operating system (OS) or virtual machine manager (VMM) 450. In other embodiments, MLF 400 may include fewer or more launching blocks as shown in FIG. 4.

In various embodiments, trusted computing may be based on the authentication of a boot-time fingerprint of a computing device, e.g., a server. For instance, Trusted Execution Technology (TXT) of Intel® is one of such examples, which provides the ability to authenticate the software stack that supports the computing environment of the server. Further, with geo-tagging, additional launch preference can be specified with respect to the geo-location of the server in order to ensure binding of a workload or a virtual machine to a specific server or set of servers in a trusted pool that physically is located in a preferred geo-location.

However, in various embodiments, the physical location of the server needs to be ensured as trustworthy. In other words, if the server is removed from its original location (e.g., relocated to a different rack or lost due to a permanent hardware issue), then the server may need to be removed from the original trust pool or otherwise be quarantined.

In various embodiments, MLF 400 may be augmented with location information 460, launch control policy (LCP) 470, or hardware information 480. In some embodiments, location information 460 may include a location tag of the server, and hardware information 480 may include a chipset key of the server. The location tag may be combined with the chipset key to generate a unique signature that may form the root of trust for MLF 400. As an example, the location tag may be combined with the chipset key and passed through a hashing function to create a unique digital signature for the server. This unique digital signature may be provisioned into LCP 470 in some embodiments.

In various embodiments, entities in MLF 400 may form a chain of trust. During boot time or at runtime, an entity in MLF 400, such as ACM 420, BIOS 430, MLE 440, or OS/VMM 450, may measure and authenticate location information 460, hardware information 480, or a combination of them to ensure physical security. With such a location-aware trusted execution, location information 460 may be measured at launch, and stored in a secure location such as TPM 250 of FIG. 2 of the server as a part of the server's MLE. In various embodiments, LCP 470 may provide specifics of the requisite authentication, such as what to authenticate and how to authenticate. In some embodiments, LCP 470 may specify and enable location aware authentication at launch. LCP 470 may be enforced on ACM 420, BIOS 430, MLE 440, or OS/VMM 450. When the authentication required by LCP 470 fails, the measuring entity (e.g., BIOS) may abort MLF 400. In other embodiments, LCP 470 may also be extended to runtime authentication in the form of heartbeats.

In various embodiments, MLF 400 may include a system boot sequence. In some embodiments, LCP 470 may be enforced after launching ACM 420, but before launching BIOS 430. In some embodiments, LCP 470 may be enforced after launching BIOS 430, but before launching MLE 440. In some embodiments, LCP 470 may be enforced after launching MLE 440, but before launching OS/VMM 450.

In various embodiments, the chain of trust of a trusted execution path may be tethered with the physical location of the server in order to secure the server to a trusted physical location. In some embodiments, a set of location tags (e.g., tag 112, tag 122, or tag 270) may be installed on racks within a data center to provide location information. The location tags may be provisioned during data center design. Further, integrated readers on the server board (e.g., reader 222 of FIG. 2) may allow the server to sense its physical location by interrogating the nearest location tag on the rack. A platform firmware module (e.g., ME 230 of FIG. 2) may control the reader to obtain the server's location and store it in a secure repository such as in L-ID 252 of TPM 250. In some embodiments, ME 230 may store the location information in an internal register or in a platform configuration register (PCR) in TPM 250.

At boot time or at runtime, ME 230 may instruct reader 222 to discover a location tag (e.g., tag 270) that is nearest to the server. After determining location information 460, ME 230 may then bind itself (i.e., the server) to that location, thereby developing location awareness for the server. In some embodiments, ACM 420, BIOS 430, MLE 440, or OS/VMM 450 may measure the discovered location tag against a known good location tag stored in location information 460 or LCP 470 for authentication in MLF 400. In some embodiments, the discovered location tag may be combined with the chipset key from hardware information 480 to generate a unique signature. ACM 420, BIOS 430, MLE 440, or OS/VMM 450 may measure the unique signature against the known good signature stored in LCP 470 for authentication in MLF 400. In some embodiments, ME 230 may have an emulated TPM within the ME. Thus, ME 230 may control the tethering operation entirely. In this case, ACM 420, BIOS 430, MLE 440, or OS/VMM 450 may directly communicate with the ME to obtain the location specific signature.

In some embodiments, at runtime, a VMM or a system management mode transfer mode (STM) based module to switch control between the VMM and the platform firmware may provide the ability to perform a beacon or heartbeat to ensure continued tethering between the server and its nearest location tag. In some embodiments, a TPMS (e.g., TPMS 280 of FIG. 2) may be used for provisioning the location tags, as well as encapsulation of location awareness in the LCPs (e.g., LCP 470) on individual servers to create secure tethering. The TPMS may also program geo-tagging information. The TPMS may interface with a load balancer, a workload scheduler, or a Cloud OS (e.g., Openstack®, Azure®, and VSphere®) to bind VMs to specific physical locations. ACM 420, BIOS 430, MLE 440, or OS/VMM 450 may then authenticate the LCP during the trusted boot process. If the location tag has changed since the last boot, the boot process may be aborted and an error message may be generated and reported.

In various embodiments, MLF 400 augmented with location awareness may offer a holistic end-to-end security solution that addresses both physical and software based attacks and ensures tethering to a desired trusted zone in a geolocation. Data centers may benefit from such kinds of MLFs with enhanced security.

Figure 5:
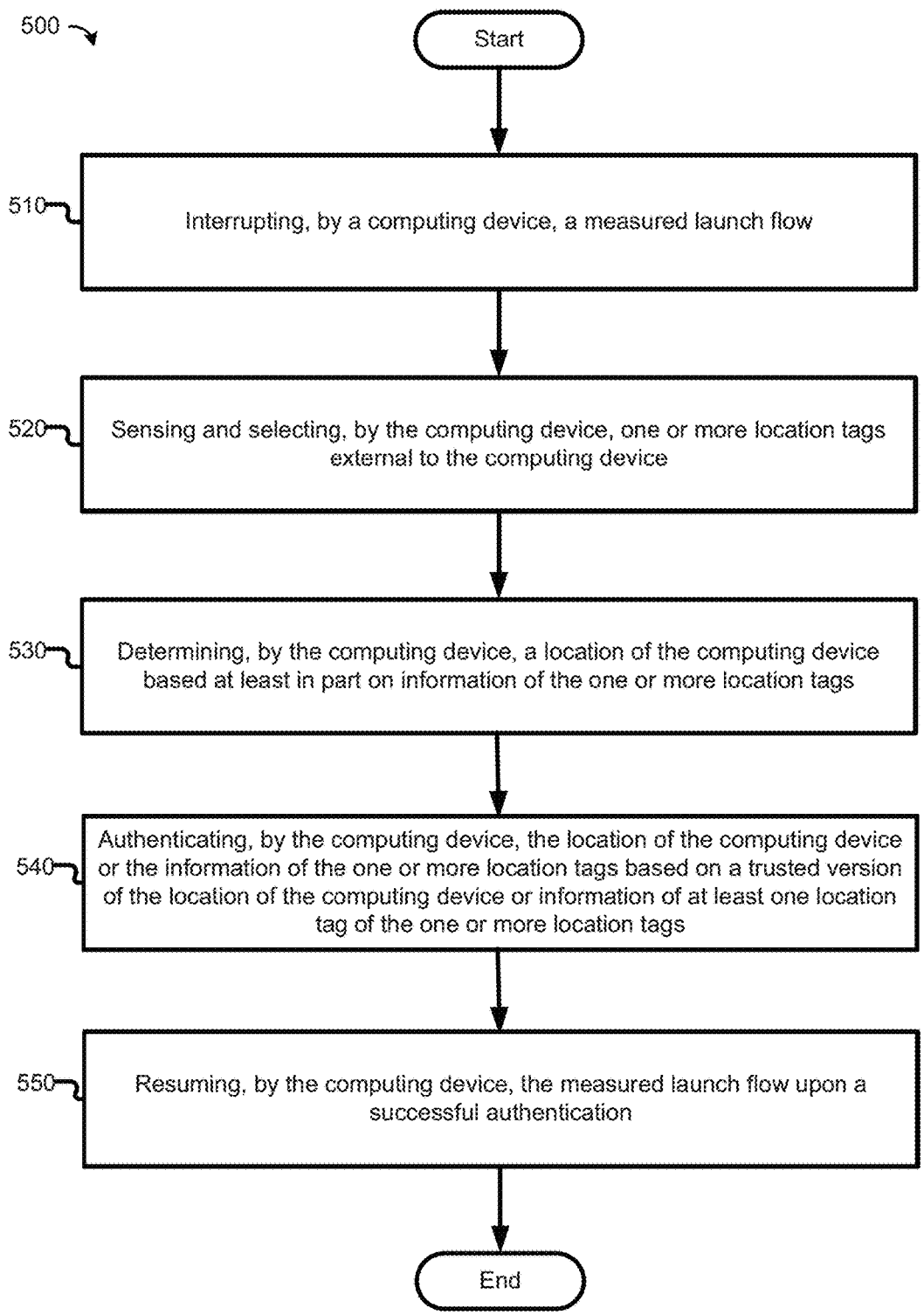
FIG. 5 is a flow diagram of an example process for trusted computing, which may be practiced by an example computing device, incorporating aspects of the present disclosure, in accordance with various embodiments.

FIG. 5 is a flow diagram of an example process for trusted computing, which may be practiced by an example computing device, incorporating aspects of the present disclosure, in accordance with various embodiments. The process 500 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for facilitating self-locating and reporting. As such, process 500 may be performed by a computing device, e.g., device 210 of FIG. 2, to implement one or more embodiments of the present disclosure. In embodiments, various blocks in FIG. 5 may be combined or arranged in any suitable order, e.g., according to the particular embodiment for trusted computing. In various embodiments, process 500 may be used for tethering a server to its physical location in order to achieve physical security of VM/workloads.

In embodiments, the process may begin at block 510, where a measured launch flow may be interrupted by a computing device, e.g., device 210 of FIG. 2. In some embodiments, the MLF may include a trusted execution path at runtime. In some embodiments, the MLF may include a booting sequence. As an example, MLF 400 may be interrupted after launching CPU microcode 410, ACM 420, BIOS 430, MLE 440, or OS/VMM 450 in authenticating the next logical block in MLF 400.

Next, at block 520, the computing device may sense and select one or more location tags external to the computing device. In some embodiments, the computing device may sense RFID signals from the one or more location tags. In some embodiments, the sensing may be periodically conducted based at least in part on a predetermined time interval. In some embodiments, the one or more location tags may be selected based on RSSI or TDOA of signals from the one or more location tags.

Next, at block 530, the computing device may determine a location of the computing device based at least in part on information of the one or more location tags. In some embodiments, such determination may be based at least in part on zone information associated with a location tag of the one or more location tags. A zone may be a predefined space or location. In some embodiments, such determination may be based at least in part on respective angles of signals from the one or more location tags. In some embodiments, such determination may be based at least in part on relative RSSI or TDOA of signals from the one or more location tags. In some embodiments, such determination may be based at least in part on detecting the strongest radio signal from the nearest location tag. In some embodiments, the information of the at least one location tag (e.g., the nearest location tag) may be stored in a PCR of a TPM of the computing device. In some embodiments, a root of trust may be generated for the MLF using a combination of the information of the at least one location tag and a chipset key of the computing device.

Next, at block 540, the computing device may authenticate the location of the computing device or the information of the one or more location tags based on a trusted version of the location of the computing device or information of at least one location tag of the one or more location tags. In some embodiments, such authentication may include authenticating a signature of a chipset of the computing device and the information of the at least one location tag of the one or more location tags. In some embodiments, such authentication may include authenticating using a hash value based on a combination of a signature of a chipset of the computing device and the information of the at least one location tag of the one or more location tags. In some embodiments, such authentication may include authenticating based on the trusted version stored in a non-volatile memory of a TPM of the computing device. In some embodiments, such authentication may include authenticating based on the trusted version stored in an LCP of the computing device. In some embodiments, such authentication may include authenticating based on the trusted version stored in an LCP provisioned by a trusted pool manager server (TPMS).

Next, at block 550, the computing device may resume the measured launch flow upon a successful authentication. In some embodiments, the computing device may resume the next logical block in the MLF. As an example, if MLF 400 was interrupted after the launch of CPU microcode 410, then ACM 420 may be launched after the successful authentication. As another example, if MLF 400 was interrupted after the launch of ACM 420, then BIOS 430 may be launched after the successful authentication. As yet another example, if MLF 400 was interrupted after the launch of BIOS 430, then MLE 440 may be launched after the successful authentication. As yet another example, if MLF 400 was interrupted after the launch of MLE 440, then OS/VMM 450 may be launched after the successful authentication. In this case, the launched VMM may bind a VM to a server located at a preferred geo-location, e.g., based on the location tag associated with the server. In other embodiments, if the authentication fails, the computing device may abort the MLF upon a failed authentication, thus preventing untrusted computing or the launch of malicious code.

Figure 6:
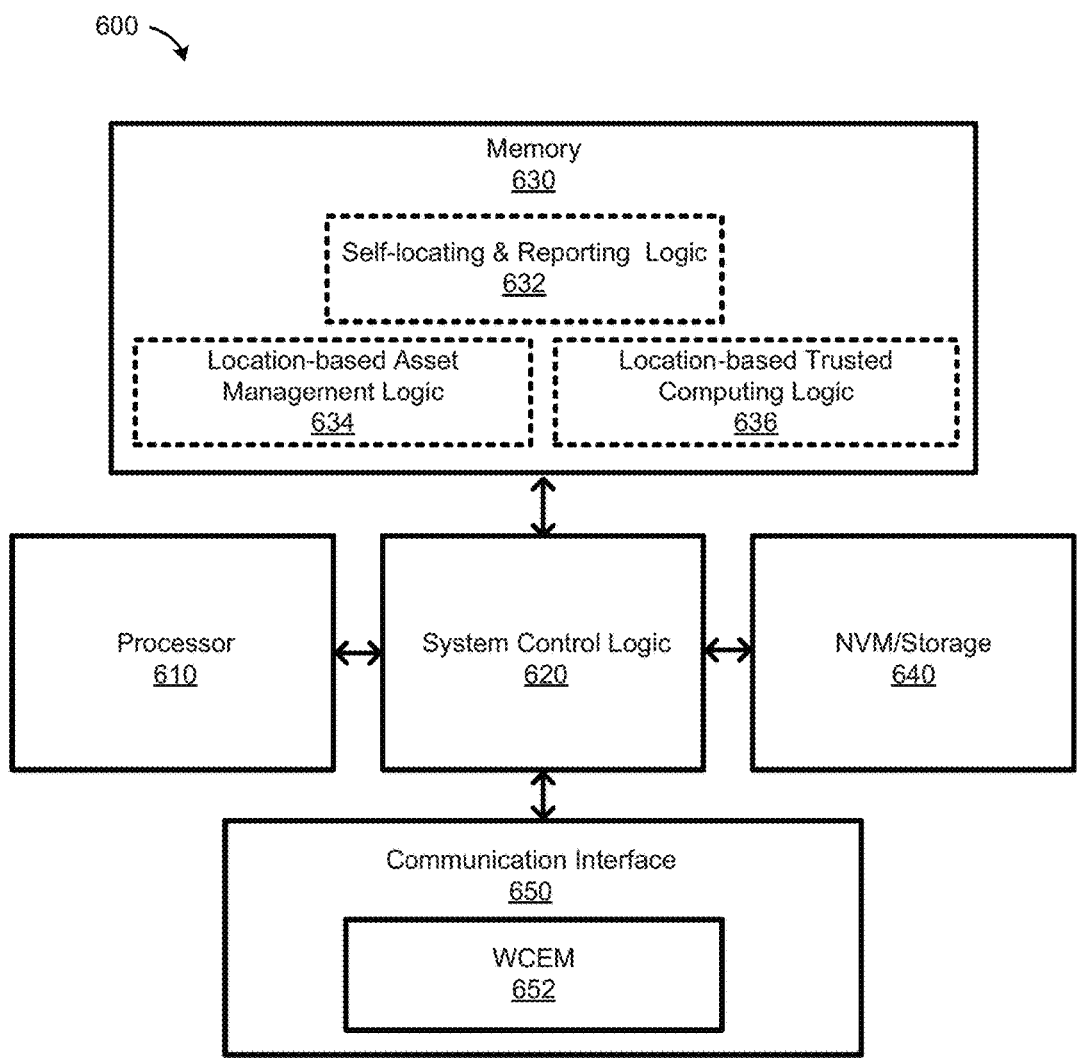
FIG. 6 illustrates an example computing device suitable for practicing the present disclosure, in accordance with various embodiments.

FIG. 6 illustrates an embodiment of a computing device 600 suitable for practicing embodiments of the present disclosure. Computing device 600 may be any computing device, such as a server, a hub, a switch, a router, a gateway, etc. As illustrated, computing device 600 may include system control logic 620 coupled to processor 610, to system memory 630, to non-volatile memory (NVM)/storage 640, and to communication interface 650. In various embodiments, processor 610 may include one or more processor cores.

In embodiments, communication interface 650 may provide an interface for computing device 600 to communicate over one or more network(s) and/or with any other suitable device. For example, as a non-asset management computing device, communication interface 650 may provide an interface for computing device 600 to communicate with an asset management server and/or various location tags as previously discussed in connection with FIG. 1. As an asset management server, communication interface 650 may provide an interface for computing device 600 to communicate with other self-locating computing devices. In embodiments, as a non-asset management computing device, communication interface 650 may include, in particular, WCEM 652 to communicate with and gather information from various location tags as described above. In alternate embodiments, WCEM 652 may be integrated with system control logic 620 or other elements of computing device 600.

Communication interface 650 may include any suitable hardware and/or firmware, such as a network adapter, a network interface card, one or more antennas, wireless interface(s), and so forth. In various embodiments, communication interface 650 may include an interface for computing device 600 to use radio-frequency identification (RFID), near field communication (NFC), optical communications, or other similar technologies to communicate directly (e.g., without an intermediary) with another device. In various embodiments, communication interface 650 may interoperate with radio communications technologies such as, for example, Wideband Code Division Multiple Access (WCDMA), Global System for Mobile Communications (GSM), Long Term Evolution (LTE), Bluetooth®, Zigbee, and the like.

In some embodiments, system control logic 620 may include any suitable interface controllers to provide for any suitable interface to the processor 610 and/or to any suitable device or component in communication with system control logic 620. System control logic 620 may also interoperate with a display (not shown) for the display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 620 may include one or more memory controller(s) (not shown) to provide an interface to system memory 630. System memory 630 may be used to load and store data and/or instructions, for example, for computing device 600. System memory 630 may include any suitable volatile memory, such as dynamic random-access memory (DRAM), for example.

In embodiments used as self-locating computing devices, system memory 630 may include self-locating and reporting logic 632. Self-locating and reporting logic 632 may include instructions that, when executed by processor 610, result in computing device 600 conducting self-locating and reporting functions, such as, but not limited to, process 300. In embodiments, self-locating and reporting logic 632 may include instructions that, when executed by processor 610, result in computing device 600 performing various functions associated with WCEM 220, ME 230, or BMC 240 in connection with FIG. 2. In embodiments used as asset management server, system memory 630 may include location-based asset management logic 634 performing operations earlier described with references to FIG. 1-3.

In embodiments used as a trusted computing device, system memory 630 may include location-based trusted computing logic 636. Location-based trusted computing logic 636 may include instructions that, when executed by processor 610, result in computing device 600 conducting trusted computing functions, such as, but not limited to, aspects of process 300 and/or 500. In embodiments, location-based trusted computing logic 636 may include instructions that, when executed by processor 610, result in computing device 600 performing various functions associated with WCEM 220, ME 230, BMC 240, TPM 250 in connection with FIG. 2. In embodiments used as trusted computing devices, system memory 630 may include location-based trusted computing logic 636 to perform operations earlier described with references to FIG. 1-5.

In some embodiments, system control logic 620 may include one or more input/output (I/O) controller(s) (not shown) to provide an interface to NVM/storage 640 and communication interface 650. NVM/storage 640 may be used to store data and/or instructions. For example, in embodiments used as an asset management server, NVM/storage 640 may be used to store, among other things, the location information of the various location tags. NVM/storage 640 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 640 may include a storage resource that is physically part of a device on which computing device 600 is installed or it may be accessible by, but not necessarily a part of, computing device 600. For example, NVM/storage 640 may be accessed by computing device 600 over a network via communication interface 650.

In some embodiments, processor 610 may be packaged together with memory having self-locating and reporting logic 632, asset management logic 634, and/or logic of WCEM 652. In some embodiments, at least one of the processor(s) 610 may be packaged together with memory having self-locating and reporting logic 632, asset management logic 634, and/or logic of WCEM 652 to form a System in Package (SiP). In some embodiments, processor 610 may be integrated on the same die with memory having self-locating and reporting logic 632, asset management logic 634, and/or logic of WCEM 652. In some embodiments, processor 610 may be integrated on the same die with memory having self-locating and reporting logic 632, asset management logic 634, and/or logic of WCEM 652 to form a System on Chip (SoC).

Depending on whether computing device 600 is used as a self-locating computing device or asset management server, the capabilities and/or performance characteristics of processor 610, system control logic 620, system memory 630, and so forth, may vary.

Figure 7:
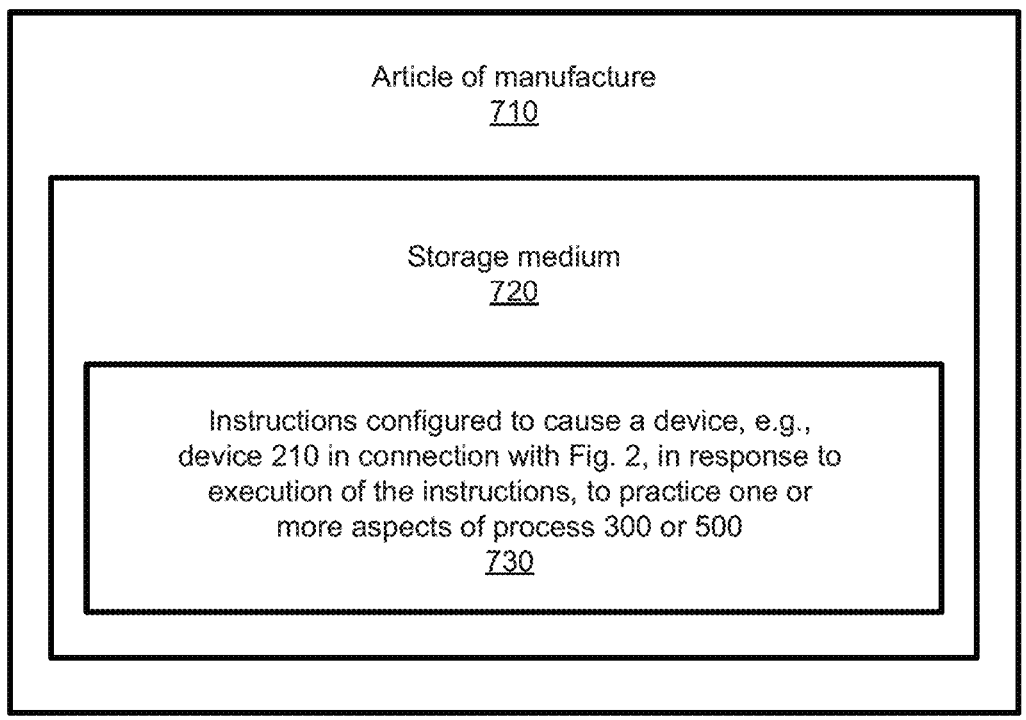
FIG. 7 illustrates an article of manufacture having programming instructions, incorporating aspects of the present disclosure, in accordance with various embodiments.

FIG. 7 illustrates an article of manufacture 710 having programming instructions, incorporating aspects of the present disclosure, in accordance with various embodiments. In various embodiments, an article of manufacture may be employed to implement various embodiments of the present disclosure. As shown, the article of manufacture 710 may include a computer-readable non-transitory storage medium 720 where instructions 730 are configured to practice embodiments of or aspects of embodiments of any one of the processes described herein. The storage medium 720 may represent a broad range of persistent storage media known in the art, including but not limited to flash memory, dynamic random-access memory, static random-access memory, an optical disk, a magnetic disk, etc. Instructions 730 may enable an apparatus, in response to their execution by the apparatus, to perform various operations described herein. As an example, storage medium 720 may include instructions 730 configured to cause an apparatus, e.g., device 210, to practice some aspects of self-locating, as illustrated in process 300 of FIG. 3, in accordance with embodiments of the present disclosure. As another example, storage medium 720 may include instructions 730 configured to cause an apparatus, e.g., device 210, to practice some aspects of trusted computing, as illustrated in process 500 of FIG. 5, in accordance with embodiments of the present disclosure. In embodiments, computer-readable storage medium 720 may include one or more computer-readable non-transitory storage media. In other embodiments, computer-readable storage medium 720 may be transitory, such as signals, encoded with instructions 730.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

A first kind of examples may include an apparatus for computing, which may include one or more processors to execute instructions; a Wireless Credential Exchange Module (WCEM), coupled to the one or more processors, to detect a location tag; and a management engine, coupled to the WCEM, to query and receive information of the location tag from the WCEM, and to provide an external asset management server with an identifier of the apparatus and information of the location tag or location information of the apparatus determined based at least in part on the information of the location tag, to self-locate the apparatus.

Another example may include the apparatus of any of the preceding first kind of examples, wherein the WCEM may include an EPCglobal UHF Class 1 Generation 2 (EPC Gen2) compliant radio-frequency identification (RFID) reader module.

Another example may include the apparatus of any of the preceding first kind of examples, wherein the apparatus is part of a server or part of a server rack.

Another example may include the apparatus of any of the preceding first kind of examples, wherein the WCEM is to determine whether the location tag is a nearest one among a plurality of location tags to the apparatus.

Another example may include the apparatus of any of the preceding first kind of examples, wherein the management engine is to determine the location information of the apparatus based at least in part on zone information associated with the location tag.

Another example may include the apparatus of any of the preceding first kind of examples, wherein the WCEM is to detect at least two location tags including the location tag, and the management engine is to determine the location information of the apparatus based at least in part on respective angles of signals from the at least two location tags.

Another example may include the apparatus of any of the preceding first kind of examples, wherein the WCEM is to detect at least four location tags including the location tag, and the management engine is to determine the location information of the apparatus based at least in part on relative signal strength intensity (RSSI) or time difference of arrival (TDOA) of signals from the at least four location tags.

Another example may include the apparatus of any of the preceding first kind of examples, wherein the apparatus may further include a baseboard management controller (BMC), coupled to the management engine, to provide the identifier of the apparatus to the management engine.

Another example may include the apparatus of any of the preceding first kind of examples, wherein the WCEM is controlled at least in part by the management engine via a USB port, a System Management Bus (SMBus), or an Inter-Integrated Circuit (I$^2$C).

Another example may include the apparatus of any of the preceding first kind of examples, wherein the WCEM includes an onboard battery, and the WCEM is configured to detect the location tag based on the onboard battery.

Another example may include the apparatus of any of the preceding first kind of examples, wherein the WCEM is part of an onboard chip coupled to the management engine via a platform controller hub.

Another example may include the apparatus of any of the preceding first kind of examples, wherein the management engine is to periodically query and receive the information of the location tag from the WCEM based on a predetermined interval, and communicate with the asset management server using an Intelligent Platform Management Interface (IPMI) or a Data Center Manageability Interface (DCMI).

Another example may include the apparatus of any of the preceding first kind of examples, wherein the apparatus may further include a Trusted Platform Module (TPM), coupled to the management engine, to store the information of the location tag and at least one Launch Control Policy (LCP) with a trusted version of the information of the location tag.

Another example may include the apparatus of any of the preceding first kind of examples, wherein the TPM is to facilitate a creation of a root of trust for a measured launch flow of the apparatus using a combination of the information of the location tag and a chipset key of the apparatus.

Another example may include the apparatus of any of the preceding first kind of examples, wherein the TPM is to facilitate an authentication of the information of the location tag based on the LCP during the measured launch flow.

A second kind of examples may include a method for self-locating computing, comprising: sensing and selecting, by a computing device, one or more location tags; determining, by the computing device, a location of the computing device based at least in part on information of the one or more location tags; and providing, by the computing device, an identifier of the computing device and the location of the computing device or the information of the one or more location tags to an asset management server to self-locate the computing device.

Another example may include the method of any of the preceding second kind of examples, further comprising selecting, by the computing device, the identifier from a plurality of identification information or platform data from a plurality of platform data, and wherein the providing comprises providing platform data bundled with the identifier and the location to the asset management server.

Another example may include the method of any of the preceding second kind of examples, wherein the plurality of identification information may include system asset identifiers, firmware revision information, Basic Input/Output System (BIOS) revision information, rework identifiers, manufacturer information, or operating system (OS) licensing information.

Another example may include the method of any of the preceding second kind of examples, wherein platform data may include networking information, device errors, hang conditions, or power down conditions.

Another example may include the method of any of the preceding second kind of examples, wherein the sensing may further include sensing EPCglobal UHF Class 1 Generation 2 (EPC Gen2) compliant radio-frequency identification (RFID) signals from the one or more location tags.

Another example may include the method of any of the preceding second kind of examples, wherein the sensing is periodically conducted based at least in part on a predetermined time interval.

Another example may include the method of any of the preceding second kind of examples, wherein the determining further comprises determining the location of the computing device based at least in part on zone information associated with a location tag of the one or more location tags.

Another example may include the method of any of the preceding second kind of examples, wherein the determining further comprises determining the location of the computing device based at least in part on respective angles of signals from the one or more location tags.

Another example may include the method of any of the preceding second kind of examples, wherein the determining further comprises determining the location of the computing device based at least in part on relative signal strength intensity (RSSI) or time difference of arrival (TDOA) of signals from the one or more location tags.

Another example may include the method of any of the preceding second kind of examples, wherein the providing further comprises providing the location of the computing device to the asset management server using an Intelligent Platform Management Interface (IPMI) or a Data Center Manageability Interface (DCMI).

Another examples may include an apparatus comprising means to perform any of the preceding second kind of examples.

Another example may include one or more non-transitory computer readable media comprising instructions to cause an apparatus, upon execution of the instructions by one or more processors of the apparatus, to perform any of the preceding second kind of examples.

A third kind of examples may include a system for self-locating based asset management of computing devices. The system may include a plurality of location tags with respective known locations; an asset management server, configured with information of the plurality of location tags, to respond to queries about location information of a plurality of computing devices; and at least one computing device with a Wireless Credential Exchange Module (WCEM) to detect one or more location tags of the plurality of location tags; and a management engine, coupled to the WCEM, to retrieve information of the one or more location tags from the WCEM, and to provide the asset management server with an identifier of the computing device and the information of the one or more location tags or location information of the computing device to self-locate the at least one computing device to the asset management server.

Another example may include the system of any of the preceding third kind of examples, wherein the asset management server is to determine a location of the at least one computing device based at least in part on information of relative signal strength intensity (RSSI) or time difference of arrival (TDOA) of signals from the one or more location tags in the information of the one or more location tags.

Another example may include the system of any of the preceding third kind of examples, wherein the asset management server is to periodically query the location information of the computing device using an Intelligent Platform Management Interface (IPMI) or a Data Center Manageability Interface (DCMI).

A fourth kind of examples may include a method comprising: interrupting, by a computing device, a measured launch flow; sensing and selecting, by the computing device, one or more location tags external to the computing device; determining, by the computing device, a location of the computing device based at least in part on information of the one or more location tags; authenticating, by the computing device, the location of the computing device or the information of the one or more location tags, to self-locate the computing device, based on a trusted version of the location of the computing device or information of at least one location tag of the one or more location tags; and resuming, by a computing device, the measured launch flow upon a successful authentication.

Another example may include the method of any of the preceding fourth kind of examples. The method may further include aborting the measured launch flow upon a failed authentication.

Another example may include the method of any of the preceding fourth kind of examples. The method may further include storing the information of the at least one location tag in a platform configuration register (PCR) of a Trusted Platform Module (TPM) of the computing device.

Another example may include the method of any of the preceding fourth kind of examples. The method may further include creating a root of trust for the measured launch flow using a combination of the information of the at least one location tag and a chipset key of the computing device.

Another example may include the method of any of the preceding fourth kind of examples, wherein authenticating may include separately authenticating a signature of a chipset of the computing device and the information of the at least one location tag of the one or more location tags.

Another example may include the method of any of the preceding fourth kind of examples, wherein authenticating may include authenticating using a hash value based on a combination of a signature of a chipset of the computing device and the information of the at least one location tag of the one or more location tags.

Another example may include the method of any of the preceding fourth kind of examples, wherein the measured launch flow may include a system boot sequence, wherein authenticating may further include authenticating after launching an authenticated code module (ACM) of the computing device, but before launching a BIOS of the computing device at the system boot sequence.

Another example may include the method of any of the preceding fourth kind of examples, wherein the measured launch flow may include a system boot sequence, wherein authenticating may further include authenticating after launching a BIOS of the computing device, but before launching a Measured Launch Environment (MLE) of the computing device at the system boot sequence.

Another example may include the method of any of the preceding fourth kind of examples, wherein the measured launch flow may include a system boot sequence, wherein authenticating may further include authenticating after launching a Measured Launch Environment (MLE) of the computing device, but before launching an operating system (OS) or a virtual machine manager (VMM) of the computing device at the system boot sequence.

Another example may include the method of any of the preceding fourth kind of examples, wherein authenticating may include authenticating based on the trusted version stored in a non-volatile memory of a Trusted Platform Module (TPM) of the computing device.

Another example may include the method of any of the preceding fourth kind of examples, wherein authenticating may include authenticating based on the trusted version stored in a Launch Control Policy (LCP) of the computing device.

Another example may include the method of any of the preceding fourth kind of examples, wherein authenticating may include authenticating based on the trusted version stored in a Launch Control Policy (LCP) provisioned by a trusted pool manager server (TPMS).

Another example may include the method of any of the preceding fourth kind of examples, wherein resuming may include binding a virtual machine to the computing device based on the location of the computing device or the information of the one or more location tags.

Another examples may include an apparatus comprising means to perform any of the preceding fourth kind of examples.

Another example may include one or more non-transitory computer readable media comprising instructions to cause an apparatus, upon execution of the instructions by one or more processors of the apparatus, to perform any of the preceding fourth kind of examples.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A self-locating apparatus for computing, comprising:
one or more processors to execute instructions;
a Wireless Credential Exchange Module (WCEM), coupled to the one or more processors, to detect a location tag;
a management engine, coupled to the WCEM, to query and receive information of the location tag from the WCEM, to provide an external asset management server with an identifier of the apparatus and information of the location tag or a location information of the apparatus determined based at least in part on the information of the location tag, to facilitate creation of a root of trust using a combination of the identifier of the apparatus and the information of the location tag or the location information of the apparatus, and to use the root of trust during boot time or runtime to self-locate the apparatus and ensure the apparatus is in a location.

2. The apparatus according to claim 1, wherein the apparatus is part of a server or part of a server rack.

3. The apparatus according to claim 1, wherein the WCEM is to determine whether the location tag is a nearest one among a plurality of location tags to the apparatus, and wherein the management engine is to determine the location information of the apparatus based at least in part on zone information associated with the location tag.

4. The apparatus according to claim 1, wherein the WCEM is to detect at least two location tags including the location tag, and the management engine is to determine the location information of the apparatus based at least in part on respective angles of signals from the at least two location tags.

5. The apparatus according to claim 1, wherein the WCEM is to detect at least four location tags including the location tag, and the management engine is to determine the location information of the apparatus based at least in part on relative signal strength intensity (RSSI) or time difference of arrival (TDOA) of signals from the at least four location tags.

6. The apparatus according to claim 1, further comprising:
a baseboard management controller (BMC), coupled to the management engine, to provide the identifier of the apparatus to the management engine.

7. The apparatus according to claim 1, wherein the WCEM is part of an onboard chip coupled to the management engine via a platform controller hub, wherein the WCEM comprises an onboard battery, and the WCEM is configured to detect the location tag using power from the onboard battery.

8. The apparatus according to claim 1, wherein the management engine is to periodically query and receive the information of the location tag from the WCEM based on a predetermined interval, communicate with the asset management server using an Intelligent Platform Management Interface (IPMI) or a Data Center Manageability Interface (DCMI), and use the root of trust to interrupt a trusted execution path (TEP) or a measured launch flow (MLF) of the apparatus if the information of the location tag or the location information of the apparatus indicates the apparatus is not in the location.

9. The apparatus according to claim 1, further comprising:
a Trusted Platform Module (TPM), coupled to the management engine, to store the information of the location tag and at least one Launch Control Policy (LCP) with a trusted version of the information of the location tag.

10. The apparatus according to claim 9, wherein the TPM is to facilitate a creation of the root of trust for a measured launch flow of the apparatus using the combination of the information of the location tag and the identifier of the apparatus, wherein the identifier of the apparatus comprises a chipset key of the apparatus.

11. The apparatus according to claim 10, wherein the TPM is to facilitate an authentication of the information of the location tag based on the LCP during the measured launch flow.

12. A method for computing, comprising:
sensing and selecting, by a computing device, one or more location tags;
determining, by the computing device, a location of the computing device based at least in part on information of the one or more location tags;

providing, by the computing device, an identifier of the computing device and the location of the computing device or the information of the one or more location tags to an asset management server to self-locate the computing device;

storing the location information of the one or more location tags in a root of trust; and using the root of trust to authenticate a trusted execution path (TEP) or measured launch flow (MLF) of the computing device.

13. The method of claim 12, further comprising:
selecting, by the computing device, the identifier from a plurality of identification information or platform data from a plurality of platform data;

wherein the sensing is periodically conducted based at least in part on a predetermined time interval, wherein the providing comprises providing platform data bundled with the identifier and the location to the asset management server.

14. The method of claim 13, wherein the plurality of identification information comprises system asset identifiers, firmware revision information, Basic Input/Output System (BIOS) revision information, rework identifiers, manufacturer information, or operating system (OS) licensing information; wherein platform data comprises networking information, device errors, hang conditions, or power down conditions.

15. The method of claim 12, wherein the providing further comprises providing the location of the computing device to the asset management server using an Intelligent Platform Management Interface (IPMI) or a Data Center Manageability Interface (DCMI).

16. The method of claim 12, wherein the determining further comprises determining the location of the computing device based at least in part on zone information associated with a location tag of the one or more location tags; wherein the determining further comprises determining the location of the computing device based at least in part on respective angles of signals from the one or more location tags; or wherein the determining further comprises determining the location of the computing device based at least in part on relative signal strength intensity (RSSI) or time difference of arrival (TDOA) of signals from the one or more location tags.

17. At least one non-transitory computer readable storage medium, comprising: a plurality of instructions configured to cause an apparatus, in response to execution of the instructions by the apparatus, to practice the method of claim 12.

18. A method for computing, comprising:
interrupting, by a computing device, a measured launch flow;

sensing and selecting, by the computing device, one or more location tags external to the computing device;

determining, by the computing device, a location of the computing device based at least in part on information of the one or more location tags;

authenticating, by the computing device, the location of the computing device or the information of the one or more location tags, to self-locate the computing device, based on a trusted version of the location of the computing device or information of at least one location tag of the one or more location tags; and resuming, by a computing device, the measured launch flow upon a successful authentication.

19. The method of claim 18, further comprising:
aborting the measured launch flow upon a failed authentication;

storing the information of the at least one location tag in a platform configuration register (PCR) of a Trusted Platform Module (TPM) of the computing device; and creating a root of trust for the measured launch flow using a combination of the information of the at least one location tag and a chipset key of the computing device.

20. The method of claim 18, wherein authenticating comprises separately authenticating a signature of a chipset of the computing device and the information of the at least one location tag of the one or more location tags; or wherein authenticating comprises authenticating using a hash value based on a combination of a signature of a chipset of the computing device and the information of the at least one location tag of the one or more location tags.

21. The method of claim 18, wherein the measured launch flow comprises a system boot sequence, wherein authenticating comprises at least one of authenticating after launching an authenticated code module (ACM) of the computing device, but before launching a BIOS of the computing device at the system boot sequence; wherein authenticating comprises authenticating after launching a BIOS of the computing device, but before launching a Measured Launch Environment (MLE) of the computing device at the system boot sequence; or wherein authenticating comprises authenticating after launching a Measured Launch Environment (MLE) of the computing device, but before launching an operating system (OS) or a virtual machine manager (VMM) of the computing device at the system boot sequence.

22. The method of claim 18, wherein authenticating comprises authenticating based on the trusted version of the location of the computing device stored in a non-volatile memory of a Trusted Platform Module (TPM) of the computing device; or wherein authenticating comprises authenticating based on the trusted version of the location of the computing device stored in a Launch Control Policy (LCP) of the computing device.

23. The method of claim 18, wherein authenticating comprises authenticating based on the trusted version of the location of the computing device stored in a Launch Control Policy (LCP) provisioned by a trusted pool manager server (TPMS).

24. The method of claim 18, wherein resuming comprises binding a virtual machine to the computing device based on the location of the computing device or the information of the one or more location tags.

25. At least one non-transitory computer readable storage medium, comprising: a plurality of instructions configured to cause an apparatus, in response to execution of the instructions by the apparatus, to practice the method of claim 18.

* * * * *